(12) United States Patent
Stockstill

(10) Patent No.: US 9,421,552 B2
(45) Date of Patent: Aug. 23, 2016

(54) SHREDDER LOAD OPTIMIZATION SYSTEM AND METHOD

(71) Applicant: Wade Stockstill, Houston, TX (US)

(72) Inventor: Wade Stockstill, Houston, TX (US)

(73) Assignee: Amerimex Motor & Controls, LLC, Houston, TX (US)

( * ) Notice: Subject to any disclaimer, the term of this patent is extended or adjusted under 35 U.S.C. 154(b) by 58 days.

(21) Appl. No.: 14/173,568

(22) Filed: Feb. 5, 2014

(65) Prior Publication Data

US 2014/0333237 A1 Nov. 13, 2014

Related U.S. Application Data

(60) Provisional application No. 61/760,906, filed on Feb. 5, 2013.

(51) Int. Cl.
| | |
|---|---|
| *H02P 1/00* | (2006.01) |
| *H02P 3/00* | (2006.01) |
| *H02P 5/00* | (2016.01) |
| *B02C 25/00* | (2006.01) |
| *B02C 18/24* | (2006.01) |
| *H02J 7/00* | (2006.01) |
| *H02J 9/06* | (2006.01) |

(52) U.S. Cl.
CPC ............... *B02C 25/00* (2013.01); *B02C 18/24* (2013.01); *H02J 7/0068* (2013.01); *H02J 9/061* (2013.01)

(58) Field of Classification Search
CPC ............... H02P 4/00; H02J 7/34; B02C 25/00
USPC .......................................................... 318/139
See application file for complete search history.

(56) References Cited

U.S. PATENT DOCUMENTS

| | | | | | |
|---|---|---|---|---|---|
| 5,252,904 | A | * | 10/1993 | Nanos | ................. H02P 23/0072 318/484 |
| 5,561,356 | A | * | 10/1996 | Nanos | ...................... G05F 1/70 318/438 |
| 2010/0170969 | A1 | * | 7/2010 | Jensen | ................ B02C 18/0007 241/25 |

* cited by examiner

*Primary Examiner* — Erick Glass
(74) *Attorney, Agent, or Firm* — Dentons US LLP; Brian R. McGinley

(57) ABSTRACT

An electrical power load optimization system operable to regulate a power supply to one or more industrial machines so that a load imposed on the power supply by the one or more machines is consistent and fluctuations are minimized.

34 Claims, 6 Drawing Sheets

SHREDDER LOAD OPTIMIZATION SYSTEM AND METHOD

CROSS-REFERENCE TO RELATED APPLICATION

This patent application claims priority to U.S. Provisional Patent Application Ser. No. 61/760,906 titled SHREDDER LOAD OPTIMIZATION SYSTEM, and filed Feb. 5, 2013, the entire contents of which are herein incorporated by reference in its entirety.

BACKGROUND

1. Field

The present inventive concept relates to industrial equipment and systems for electrical load reduction. More particularly, the present invention relates to a system for electrical load optimization utilizing an energy-storage system for an industrial shredder.

2. Description of Related Art

During use of a conventional industrial shredder, a power load is imposed on a power source that is subject to considerable and rapid fluctuations as the shredder operates. Indeed, the power load created by the shredder regularly fluctuates between relatively low loads and relatively high or full loads within only a few seconds depending on a variety of factors including whether the shredder is actively shredding or not shredding material.

The fluctuating power load of the shredder creates a number of problems. For instance, a utility company responsible for supplying power to the shredder and ensuring demands of the power source are adequately addressed is unable to predict load fluctuations and, in some circumstances, may not have a sufficient reserve of power to accommodate power-load spikes. In such scenarios, operation of the shredder may be interrupted. Further, during a rapid decrease in power load after a power-load spike, the shredder may waste or underutilize power that had been routed to the shredder to accommodate the spike.

Thus, there is a demand for an industrial shredder that, when in use, is operable to minimize power-load fluctuations and impose a consistent power load on a power source, thereby optimizing use of power.

SUMMARY

The present general inventive concept remedies the aforementioned problems and provides, in its simplest form, an electrical power load optimization system operable to regulate a power supply to one or more industrial machines so that a load imposed on the power supply by the one or more machines is consistent and fluctuations are minimized.

It is an object of the present inventive concept to provide a system operable to eliminate or at least reduce power-load spikes due to sudden increases in power demand by a machine electrically connected to the system.

It is an object of the present inventive concept to provide a system operable to optimize utilization of feeder lines, generators, and equipment associated with transmission of electricity to a machine electrically connected to the system.

It is an object of the present inventive concept to provide a system operable to reduce dependence of a machine electrically connected to the system on an electrical grid.

It is an object of the present inventive concept to provide a system operable to provide predetermined load optimization with controller implementation of a machine electrically connected to the system.

It is an object of the present inventive concept to provide a system operable to conserve energy by charging one or more batteries within the system during motor deceleration of a machine electrically connected to the system.

It is an object of the present inventive concept to provide a system operable to independently generate power using one or more batteries within the system during electrical grid outages or other unavailability of the electrical grid.

The aforementioned may be achieved in one aspect of the present inventive concept by providing an electrical power load optimization system. The system may include a bus configured to be electrically connected to a power source via an electrical pathway and a motor electrically connected to the pathway. The system may include a battery electrically connected to the pathway, configured to receive electricity from the bus, and/or configured to supply electricity to the motor. The system may include a plurality of switches electrically connected to the pathway and/or operable to select one of a plurality of modes. Each of the modes may be selected by controlling one or more the plurality of switches to divert electricity received from the bus to one or more of the motor and the battery.

The plurality of switches may include a first switch, a second switch, and/or a third switch. The plurality of switches may be operable to independently close and/or open portions of the pathway.

A first mode of the plurality of modes may be activated when the first switch is closed, the second switch is closed, and the third switch is open. The first mode may cause the bus to supply power to the motor, and/or the battery to charge and not supply power to the motor.

The first mode may be automatically activated by the system when a load on the motor is less than 40% of a full power load of the motor so that a load on the bus is less than 60% of a full power load of the motor. The first mode may cause the battery to be charged with a power equivalent of 20% or less of the full power load of the motor. The first mode may cause the battery and the bus to simultaneously supply power to the motor as the load on the motor increases.

A second mode of the plurality of modes may be activated when the first switch is closed, the second switch is open, and the third switch is open. The second mode may cause the motor to receive power directly and only from the bus. The second mode may be automatically activated by the system if the battery is charged at 80% of a full power load of the motor. The second mode may be automatically activated by the system if a load on the motor is higher than a predetermined amount. The predetermined amount of the load on the motor may be between 60% and 70% of the full power load of the motor.

A third mode of the plurality of modes may be activated when the first switch is closed, the second switch is open, and the third switch is closed. The third mode may causes the motor to receive power from the bus and the battery, and/or the battery to not receive power from the bus. The third mode may be automatically activated by the system when the load on the motor is escalating and exceeds 60% of the motor load capacity. The third mode may remain activated by the system until the battery is drained or until the load on the motor falls below 60% of the full power load of the motor.

A fourth mode of the plurality of modes may be activated when the first switch is open, the second switch is open, and the third switch is closed. The fourth mode may cause the motor to receive power from the battery, the battery to not receive power from the bus, and/or the motor to not receive power from the bus. The fourth mode may be automatically activated by the system when the bus has no power.

A fifth mode of the plurality of modes may be activated when the first switch is open, the second switch is open, and the third switch is closed. The fifth mode may cause the motor to send power from the battery, the battery to not receive power from the bus, and/or the motor to not receive power from the bus. The fifth mode may be automatically activated by the system when a load imposed by the motor begins to suddenly decrease. The fifth mode may cause power to be routed to the battery so that the battery is charged.

The motor may be configured for use with, e.g., to drive, a machine that imposes a variable load on the system. The machine maybe a shredder that, during use, requires the variable load based on whether the shredder is actively shredding material.

The aforementioned may be achieved in another aspect of the present inventive concept by providing a method to optimize power using an electrical power load optimization system. The method may include the step of electrically connecting a bus configured to a power source via an electrical pathway. The method may include the step of electrically connecting a motor electrically to the pathway. The method may include the step of electrically connecting a battery to the pathway, the battery configured to receive electricity from the bus and supply electricity to the motor. The method may include the step of electrically connecting a plurality of switches to the pathway, the plurality of switches operable to select one of a plurality of modes. The method may include the step of selecting one of the plurality of modes by changing a state of at least one of the plurality of switches to divert electricity received from the bus to one or more of the motor and the battery.

Other systems, methods, features, and advantages of the present inventive concept will be or will become apparent to one with skill in the art upon examination of the following figures and detailed description. It is intended that all such additional systems, methods, features, and advantages be included within this description, be within the scope of the present inventive concept, and be protected by the accompanying claims.

BRIEF DESCRIPTION OF THE DRAWINGS

The accompanying figures, which are incorporated in and constitute a part of this specification, illustrate an implementation of the present inventive concept and, together with the description, serve to explain the advantages and principles of the present inventive concept. In the figures.

The figures do not limit the present inventive concept to the specific examples disclosed and described herein.

DETAILED DESCRIPTION

The following detailed description of the present general inventive concept references the accompanying drawings that illustrate specific embodiments in which the present inventive concept can be practiced. The embodiments are intended to describe aspects of the present inventive concept in sufficient detail to enable those skilled in the art to practice the present inventive concept. Other embodiments can be utilized and changes can be made without departing from the scope of the present inventive concept. The following detailed description is, therefore, not to be taken in a limiting sense. The scope of the present inventive concept is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
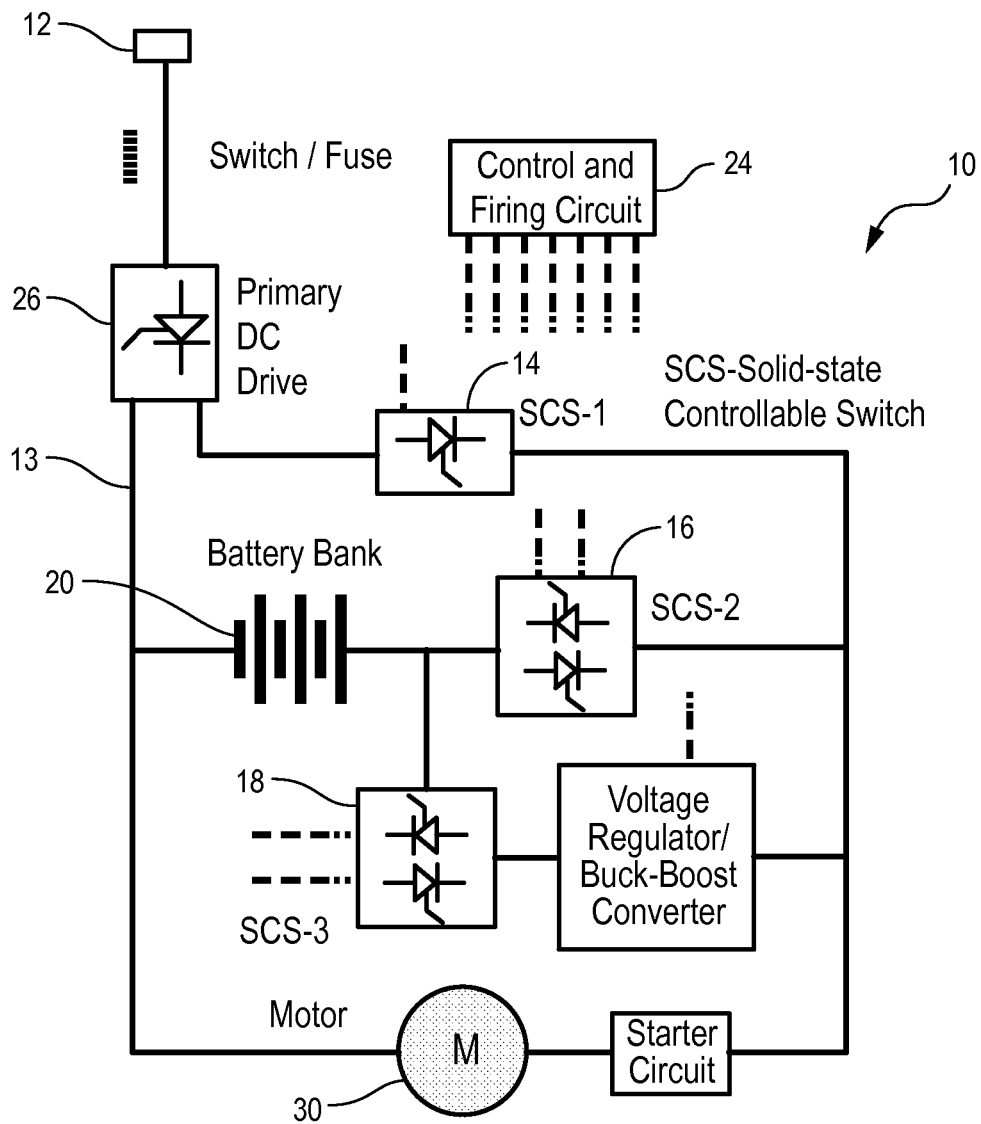
FIG. 1 is a schematic illustrating components of the present inventive concept electrically connected or connectable to each other.
Figure 2:
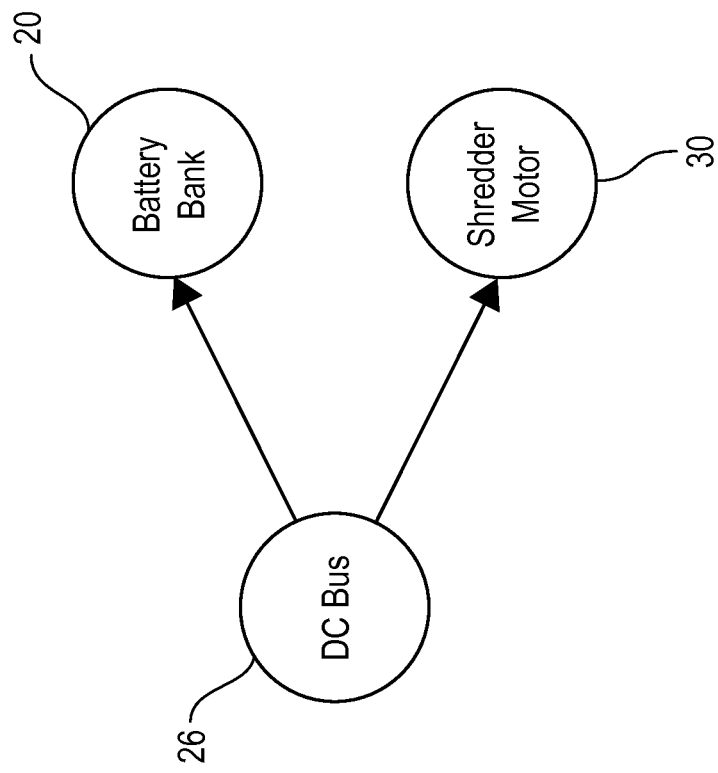
FIG. 2 is a flowchart illustrating an electrical pathway of the present inventive concept when a first mode of the present inventive concept is selected.
Figure 3:
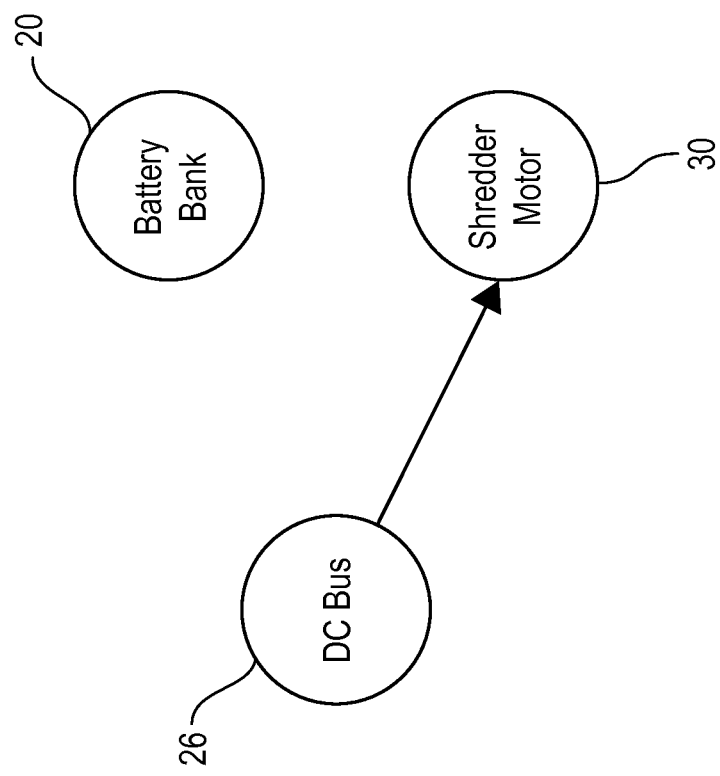
FIG. 3 is a flowchart illustrating an electrical pathway of the present inventive concept when a second mode of the present inventive concept is selected.
Figure 4:
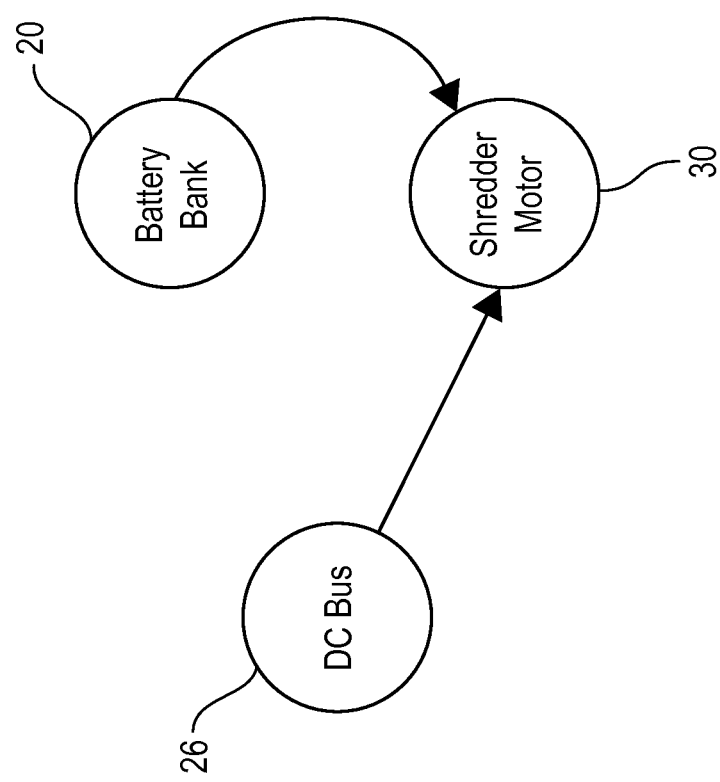
FIG. 4 is a flowchart illustrating an electrical pathway of the present inventive concept when a third mode of the present inventive concept is selected.
Figure 5:
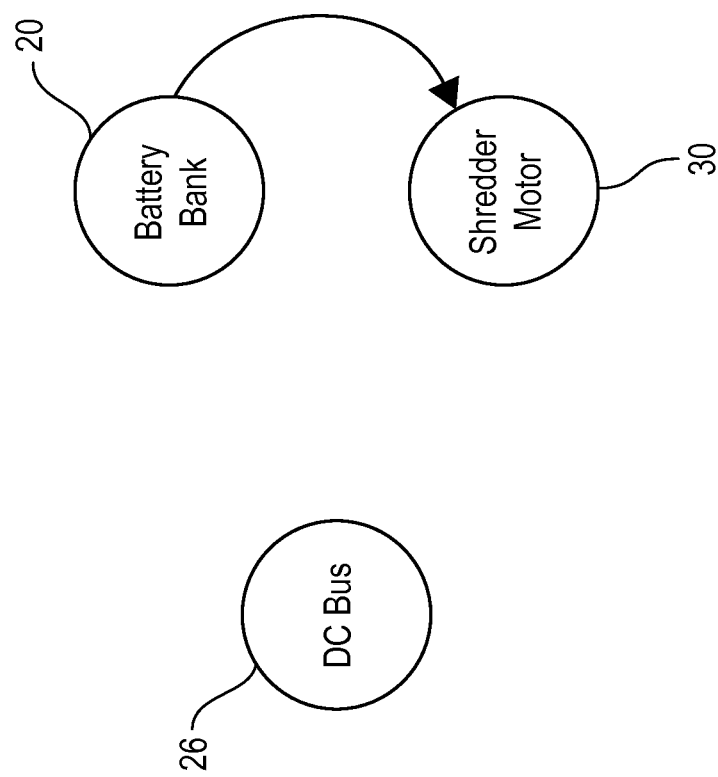
FIG. 5 is a flowchart illustrating an electrical pathway of the present inventive concept when a fourth mode of the present inventive concept is selected.
Figure 6:
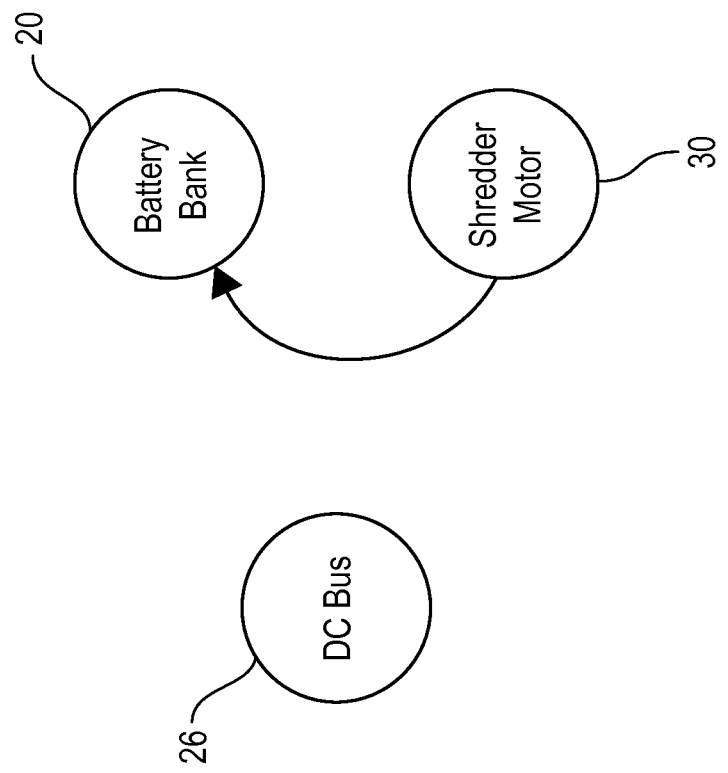
FIG. 6 is a flowchart illustrating an electrical pathway of the present inventive concept when a fifth mode of the present inventive concept is selected.

Turning to FIG. 1, the present general inventive concept includes an electrical power load optimization system 10 operable to be used to regulate a power supply 12 to one or more industrial machines, e.g., an industrial shredder. While it is foreseen that the system 10 of the present general inventive concept may be used with any machine or machines requiring a power source, for purposes herein, the system 10 is described in use with and electrically connected to the shredder.

The system 10 includes a plurality of components situated along and electrically connected to an electrical pathway 13. The pathway 13 is operable to supply power to the shredder in the form of direct current. It is foreseen that the system 10 could be configured to alternate supply of power to the shredder between direct current and alternating current, supplement supply of power to the shredder using direct current or alternating current with the other of direct current and alternating current, and/or exclusively deliver either direct current or alternating current to the shredder without deviating from the scope of the present inventive concept. In the exemplary embodiment, the pathway 13 is operable to transmit direct current between a drive or bus 26 and one or more motors 30 within the shredder. The system 10 includes three controllable switches 14, 16, and 18, a battery 20, a voltage regulator 22 and a control circuit 24.

Each of the switches 14, 16, and 18 may be controlled independently of each other or the switches 14, 16, and 18 may be controlled simultaneously to each other without deviating from the scope of the present inventive concept. The battery 20 may be a single battery or a network of batteries without deviating from the scope of the present inventive concept.

The bus 26 is configured to supply power concurrently to the one or more motors 30 within the shredder from the power storage system 10. In the exemplary embodiment of the system 10, the battery 20 is configured to store a predetermined amount of power therein. The battery 20 is operable to receive power from and be charged by an external power supply, and deliver power upon demand by the shredder.

In the exemplary embodiment of the system 10, each of the switches 14, 16 and 18 are solid state controllable switches operable to be controlled by the control circuit 24. The control circuit 24 is programmed in advance with a plurality of selectable modes. Each of the modes are based on one or more of a plurality of possible predetermined control conditions.

The timing and extent of power sharing is based on the selected mode, which is based on intended use of the shredder. The electrical load of the shredder on the power supply 12 to the battery 20 is varied dynamically depending on the load on the motor 30. Charging of the system 10 is terminated or substantially reduced when the battery 20 reaches a predetermined level. In the exemplary embodiment, the predetermined level is preferably 80% of full-charge capacity. In this manner, the battery 20 is configured to receive and store a charge when the motor 30 begins to decelerate.

In the exemplary embodiment, the system 10 includes five modes. One of the five modes may be automatically or manually selected by changing the state of one or more of the switches 14, 16, and 18, e.g., from an "on" or closed-circuit state and an "off" or open-circuit state. It is foreseen, however, that the system 10 may be programmed with any number of modes based on application of the system 10 without deviating from the scope of the present inventive concept. The state of the switches 14, 16, and 18 is automatically changed in the exemplary embodiment, but it is foreseen that the state may be changed manually without deviating from the scope of the present inventive concept.

Mode one of the system 10 is a shared-charging mode. In this mode, the switch 14 (SCS-1) is closed, the switch 16 (SCS-2) is closed, and the switch 18 (SCS-3) is open. This mode is selected when a load on the motor 30 is less than 40% of a full power load of the motor 30, i.e., load capacity of the motor 30. In this manner, the load on the bus 26 is less than 60%. The bus 26 is configured to supply power to the motor 30 and the battery 20. The battery 20 is charged with a power equivalent of 20% or less of the full power load of the motor 30. As load on the motor 30 increases past 40% of the full power load of the motor 30, power used for charging the battery 20 declines, e.g., to 0%, as the load on the motor 30 reaches 60% of the full power load of the motor 30. As the load on the motor 30 increases thereafter, the battery 20 is configured to supply power to the motor 30 in addition to and supplemental to power supplied to the motor 30 from the bus 26.

Mode two of the system 10 is a direct-load mode. In this mode, the switch 14 is closed, the switch 16 is open, and the switch 18 is open. The motor 30 is configured to receive power directly from the bus 26. This mode is selected when the battery 20 is charged at 80% of the full power load of the motor 30 or if the load on the motor 30 is higher than a predetermined amount, e.g., 60-70% of the full power load of the motor 30.

Mode three of the system 10 is a shared-load mode. In this mode, the switch 14 is closed, the switch 16 is open, and the switch 18 is closed. This mode is selected when the load on the motor 30 is escalating and exceeds 60% of the motor 30 load capacity. This mode remains selected until the battery 20 is drained or until the load on the motor 30 falls below 60% of the full power load of the motor 30.

Mode four of the system 10 is a complete-drain mode. In this mode, the switch 14 is open, the switch 16 is open, and the switch 18 is closed. This mode is triggered or automatically selected by the control circuit 24 if the motor 30 needs to be entirely supplied by the battery 20. This mode is used in a variety of scenarios that demand battery-only operation including, but not limited to, during interruptions of power from the power supply 12.

Mode five of the system is a deceleration mode. In this mode, the switch 14 is open, the switch 16 is open and the switch 18 is closed. This mode is triggered or automatically selected by the control circuit 24 if the load imposed by the motor 30 begins to suddenly decrease. In this scenario, the motor 30 rapidly decelerates with no load demand from the bus 26 and/or the battery 20. As the deceleration period may be significant and/or extended over a period of time, the power available to charge battery 20 is significant. Thus, the system 10 routes the power to the battery 20, which is charged, thereby eliminating any waste of the power.

Turning to FIGS. 2-6, various electrical pathways controlled by the aforementioned modes to/from the bus 26, battery, 20, and motor 30 are illustrated. Specifically, the bus 26 is configured to provide power to the battery 20 in mode one. The bus 26 is configured to provide power to the motor 30 in modes 1, 2, and 3. The battery 20 is configured to receive power from the bus 26 in mode 1. The battery 20 is configured to receive power from the motor 30 in mode 5. The battery 20 is configured to transmit power to the motor 30 in modes 3 and 4. The motor 30 is configured to receive power from the bus 26 in modes 1, 2, and 3. The motor 30 is configured to receive power from the battery 20 in modes 3 and 4. The motor 30 provides a source of power in mode 5 and is configured to transmit power to battery 20.

The system 10 is configured to implement a plurality of control requirements including causing the switch 18 to close so the battery 20 shares the load from the shredder. In this manner, the system 10 supplements power received from the power source 12 when, for example, the load imposed by the shredder reaches a determined threshold, such as 60% of a full load of the motor 30. Such is implemented by the system 10 using modes 3 or 4. The switch 18 is operable to close immediately when the motor 30 enters a load deceleration condition using mode 5.

In this manner, the system 10 is operable to store power received during operation of the motor 30, during operational cycles of the shredder, using the battery 20. It is foreseen that one or more additional storage devices may be used in addition to or in lieu of the battery 20, e.g., one or more flywheels. In other words, the system 10 is operable to collect and store power received from inherent-load characteristics of the shredder. It is foreseen that the load of the battery 20 may be maintained by slow or trickle charging and/or from the power supply 12. When a load above the median load is demanded by the shredder, the system 10 is configured to cause power to be transferred from the battery 20 and used in lieu of demanding all required power from the power supply 12 directly. In this manner, the system 10 provides uniform load characteristic of the shredder system on the power supply 12.

The foregoing description of an implementation of the invention has been presented for purposes of illustration and description. It is not exhaustive and does not limit the invention to the precise form disclosed. Modifications and variations are possible in light of the above teachings or may be acquired from practicing the invention. Accordingly, while various embodiments of the present invention have been described, it will be apparent to those of skill in the art that many more embodiments and implementations are possible that are within the scope of this invention. Accordingly, the present invention is not to be restricted except in light of the attached claims and their equivalents.

What is claimed is:

1. An electrical power load optimization system comprising:
    a bus configured to be electrically connected to a power source via an electrical pathway;
    a motor electrically connected to the pathway;
    a battery (i) electrically connected to the pathway, (ii) configured to receive electricity from the bus, and (iii) configured to supply electricity to the motor; and
    a plurality of switches (i) electrically connected to the pathway, and (ii) operable to select one of a plurality of modes,
    wherein,
        each of the modes are selected by controlling one or more of the plurality of switches to divert electricity received from the bus to one or more of the motor and the battery,
        the plurality of switches includes a first switch, a second switch, and a third switch, and the plurality of switches are operable to independently close and open portions of the pathway, and
        a first mode of the plurality of modes is activated when the first switch is closed, the second switch is closed, and the third switch is open, and the first mode causes (i) the bus to supply power to the motor, and (ii) the battery to charge and not supply power to the motor.

2. The electrical power load optimization system according to claim 1, wherein the first mode is automatically activated by the system when a load on the motor is less than 40% of a full power load of the motor so that a load on the bus is less than 60% of a full power load of the motor.

3. The electrical power load optimization system according to claim 1, wherein the first mode causes the battery to be charged with a power equivalent of 20% or less of the full power load of the motor.

4. The electrical power load optimization system according to claim 1, wherein the first mode causes the battery and the bus to simultaneously supply power to the motor as the load on the motor increases.

5. The electrical power load optimization system according to claim 1, wherein, a second mode of the plurality of modes is activated when the first switch is closed, the second switch is open, and the third switch is open, and the second mode causes the motor to receive power directly and only from the bus.

6. The electrical power load optimization system according to claim 5, wherein the second mode is automatically activated by the system if the battery is charged at 80% of a full power load of the motor.

7. The electrical power load optimization system according to claim 5, wherein the second mode is automatically activated by the system if a load on the motor is higher than a predetermined amount.

8. The electrical power load optimization system according to claim 7, wherein the predetermined amount of the load on the motor is between 60% and 70% of the full power load of the motor.

9. The electrical power load optimization system according to claim 1, wherein, a third mode of the plurality of modes is activated when the first switch is closed, the second switch is open, and the third switch is closed, and the third mode causes (i) the motor to receive power from the bus and the battery, and (ii) the battery to not receive power from the bus.

10. The electrical power load optimization system according to claim 9, wherein the third mode is automatically activated by the system when the load on the motor is escalating and exceeds 60% of the motor load capacity.

11. The electrical power load optimization system according to claim 10, wherein the third mode remains selected until the battery is drained or until the load on the motor falls below 60% of the full power load of the motor.

12. The electrical power load optimization system according to claim 1, wherein, a fourth mode of the plurality of modes is activated when the first switch is open, the second switch is open, and the third switch is closed, and the fourth mode causes (i) the motor to receive power from the battery, (ii) the battery to not receive power from the bus, and (iii) the motor to not receive power from the bus.

13. The electrical power load optimization system according to claim 9, wherein the fourth mode is automatically activated by the system when the bus has no power.

14. The electrical power load optimization system according to claim 1, wherein, a fifth mode of the plurality of modes is activated when the first switch is open, the second switch is open, and the third switch is closed, and the fourth mode causes (i) the motor to send power from the battery, (ii) the battery to not receive power from the bus, and (iii) the motor to not receive power from the bus.

15. The electrical power load optimization system according to claim 14, wherein the fifth mode is automatically activated by the system when a load imposed by the motor begins to suddenly decrease.

16. The electrical power load optimization system according to claim 14, wherein the fifth mode causes power to be routed to the battery so that the battery is charged.

17. The electrical power load optimization system according to claim 1, wherein, the motor is operable to drive a machine that imposes a variable load on the system, and the machine is a shredder.

18. A method of optimizing power via an electrical power load optimization system, the method comprising the steps of:
    electrically connecting a bus configured to a power source via an electrical pathway;
    electrically connecting a motor electrically to the pathway;
    electrically connecting a battery to the pathway, the battery configured to receive electricity from the bus and supply electricity to the motor;
    electrically connecting a plurality of switches to the pathway, the plurality of switches operable to select one of a plurality of modes; and selecting one of the plurality of modes by changing a state of at least one of the plurality of switches to divert electricity received from the bus to one or more of the motor and the battery,
    wherein,
        the plurality of switches includes a first switch, a second switch, and a third switch, and the plurality of switches are operable to independent close and open portions of the pathway, and
        a first mode of the plurality of modes is activated when the first switch is closed, the second switch is closed, and the third switch is open, and the first mode causes (i) the bus to supply power to the motor, and (ii) the battery to charge and not supply power to the motor.

19. The method according to claim 18, wherein the first mode is automatically activated by the system when a load on the motor is less than 40% of a full power load of the motor so that a load on the bus is less than 60% of a full power load of the motor.

20. The method according to claim 18, wherein the first mode causes the battery to be charged with a power equivalent of 20% or less of the full power load of the motor.

21. The method according to claim 18, wherein the first mode causes the battery and the bus to simultaneous supply power to the motor as the load on the motor increases.

22. The method according to claim 18, wherein, a second mode of the plurality of modes is activated when the first switch is closed, the second switch is open, and the third switch is open, and the second mode causes the motor to receive power directly and only from the bus.

23. The method according to claim 22, wherein the second mode is automatically activated by the system if the battery is charged at 80% of a full power load of the motor.

24. The method according to claim 22, wherein the second mode is automatically activated by the system if a load on the motor is higher than a predetermined amount.

25. The method according to claim 24, wherein the predetermined amount of the load on the motor is between 60% and 70% of the full power load of the motor.

26. The method according to claim 18, wherein, a third mode of the plurality of modes is activated when the first switch is closed, the second switch is open, and the third switch is closed, and the third mode causes (i) the motor to receive power from the bus and the battery, and (ii) the battery to not receive power from the bus.

27. The method according to claim 26, wherein the third mode is automatically activated by the system when the load on the motor is escalating and exceeds 60% of the motor load capacity.

28. The method according to claim 27, wherein the third mode remains selected until the battery is drained or until the load on the motor falls below 60% of the full power load of the motor.

29. The method according to claim 18, wherein, a fourth mode of the plurality of modes is activated when the first switch is open, the second switch is open, and the third switch is closed, and the fourth mode causes (i) the motor to receive power from the battery, (ii) the battery to not receive power from the bus, and (iii) the motor to not receive power from the bus.

30. The method according to claim 26, wherein the fourth mode is automatically activated by the system when the bus has no power.

31. The method according to claim 18, wherein, a fifth mode of the plurality of modes is activated when the first switch is open, the second switch is open, and the third switch is closed, and the fourth mode causes (i) the motor to send power from the battery, (ii) the battery to not receive power from the bus, and (iii) the motor to not receive power from the bus.

32. The method according to claim 31, wherein the fifth mode is automatically activated by the system when a load imposed by the motor begins to suddenly decrease.

33. The method according to claim 31, wherein the fifth mode causes power to be routed to the battery so that the battery is charged.

34. The method according to claim 18, wherein, the motor is operable to drive a machine that imposes a variable load on the system, and the machine is a shredder.

* * * * *